(12) United States Patent
Kovalchick et al.

(10) Patent No.: US 9,157,160 B2
(45) Date of Patent: Oct. 13, 2015

(54) SYSTEM AND METHOD FOR ELECTROPOLISHING OR ELECTROPLATING CONVEYOR BELTS

(71) Applicant: ASHWORTH BROS., INC., Fall River, MA (US)

(72) Inventors: Matthew James Kovalchick, Front Royal, VA (US); Jay F. Drummond, Martinsburg, WV (US)

(73) Assignee: ASHWORTH BROS., INC., Fall River, MA (US)

( * ) Notice: Subject to any disclaimer, the term of this patent is extended or adjusted under 35 U.S.C. 154(b) by 167 days.

(21) Appl. No.: 13/973,252

(22) Filed: Aug. 22, 2013

(65) Prior Publication Data

US 2015/0053567 A1     Feb. 26, 2015

(51) Int. Cl.

| | |
|---|---|
| *C25D 17/02* | (2006.01) |
| *C25D 7/06* | (2006.01) |
| *C25D 5/04* | (2006.01) |
| *C25F 3/16* | (2006.01) |
| *C25D 5/02* | (2006.01) |
| *C25D 7/00* | (2006.01) |
| *C25D 17/00* | (2006.01) |
| *C25F 7/00* | (2006.01) |
| *B65G 49/02* | (2006.01) |

(52) U.S. Cl.
CPC .. *C25D 5/04* (2013.01); *C25D 5/02* (2013.01); *C25D 7/00* (2013.01); *C25D 7/0621* (2013.01); *C25D 17/00* (2013.01); *C25D 17/004* (2013.01); *C25D 17/02* (2013.01); *C25F 3/16* (2013.01); *C25F 7/00* (2013.01); *B65G 49/02* (2013.01)

(58) Field of Classification Search
CPC .......... C25D 7/06; C25D 5/04; C25D 17/004; C25D 7/0621; C25F 3/16; B65G 49/02
See application file for complete search history.

(56) References Cited

U.S. PATENT DOCUMENTS

| | | |
|---|---|---|
| 2,395,437 A | 2/1946 | Venable |
| 2,974,097 A | 3/1961 | Ramirez et al. |
| 3,359,189 A | 12/1967 | Cooke et al. |
| 3,399,130 A | 8/1968 | Lovekin et al. |
| 3,506,546 A | 4/1970 | Semienko et al. |

(Continued)

FOREIGN PATENT DOCUMENTS

| | | |
|---|---|---|
| EP | 2 173 927 B1 | 2/2011 |
| GB | 557386 | 11/1943 |

(Continued)

OTHER PUBLICATIONS

International Search Report and Written Opinion, International Patent Application No. PCT/US2013/056151, mailed Apr. 1, 2014.

*Primary Examiner* — Nicholas A Smith

(74) *Attorney, Agent, or Firm* — Nixon Peabody LLP; Jeffrey L. Costellia

(57) ABSTRACT

An electropolishing or electroplating system and method for metal conveyor belts is described. As opposed to conventional polishing processes in which the product is guided around rollers which direct the product into and out of an electrolyte bath, embodiments of the present invention pass the product through a housing supplied with a continuous directional flow of electrolyte. Thus, the electroplating or electropolishing can be targeted to specific areas of the product, such as the edges and/or the center of a conveyor belt, and straight products can pass through the housing without deformation.

29 Claims, 3 Drawing Sheets

(56) References Cited

U.S. PATENT DOCUMENTS

| | | |
|---|---|---|
| 3,567,595 A | 3/1971 | Yates et al. |
| 3,652,428 A * | 3/1972 | Araya .................... 205/138 |
| 3,676,322 A | 7/1972 | Kamata et al. |
| 3,809,642 A | 5/1974 | Bond et al. |
| 3,817,843 A | 6/1974 | Barrett et al. |
| 3,868,104 A | 2/1975 | Hunt et al. |
| 4,039,398 A | 8/1977 | Furuya |
| 4,419,204 A | 12/1983 | Birkle et al. |
| 4,425,213 A | 1/1984 | Laverty et al. |
| 4,576,684 A | 3/1986 | Bechem et al. |
| 4,647,345 A | 3/1987 | Polan |
| 4,772,371 A | 9/1988 | Lace et al. |
| 4,935,112 A | 6/1990 | Stokes |
| 6,340,422 B1 | 1/2002 | Vries et al. |

FOREIGN PATENT DOCUMENTS

| | | |
|---|---|---|
| GB | 603915 | 6/1948 |
| GB | 732585 | 6/1955 |
| GB | 786743 | 11/1957 |
| GB | 1 415 913 | 12/1975 |
| GB | 2 098 239 A | 11/1982 |
| WO | WO-2009/013398 A2 | 1/2009 |

* cited by examiner

SYSTEM AND METHOD FOR ELECTROPOLISHING OR ELECTROPLATING CONVEYOR BELTS

BACKGROUND

1. Field

Embodiments of the claimed invention relate to electropolishing and electroplating, and in particular, systems and methods for electropolishing or electroplating localized areas of continuous assemblies of interconnected components, such as conveyor belts.

2. Description of Related Art

Conveyor belt systems are used in various industrial fields for material handling and processing purposes. For instance, conveyor systems are used within food processing systems in which food items are placed on the support surface of a conveyor belt and processed, while being conveyed from one location to another. Various types of conveyor belts exist, including modular conveyor belts, which are especially popular in food processing systems. Moreover, conveyor systems are often used in a helical accumulator such as that disclose in U.S. Pat. No. 5,070,999 to Layne et al. which allows storage of a large number of items in the conveyor system.

In the food processing industry, it is of the utmost importance that conveyors belts are sanitary. To accomplish this, conveyor belts are conventionally wiped down, washed, and/or steamed on a regular basis. However, conveyor belts are often very long, extending hundreds or even thousands of feet. In these cases, the belts can be difficult to clean and may become less durable over time due to the thorough process needed to maintain their sanitation.

Electropolishing and electroplating has been previously used in a number of applications. U.S. Pat. No. 4,895,633 to Seto et al. discloses a conventional molten salt electroplating apparatus for forming plating on steel strips, sheets, and wires. A steel strip is continuously unwound from a pay-off reel, passed through a looper, and sent to a pretreatment apparatus. Next, the surface of the steel strip is plated as it passes between electrodes immersed in electroplating solution. The steel strip is then washed and dried, passed through a looper and a shearing machine, then wound onto a tension reel.

U.S. Pat. No. 7,407,051 B1 to Farris et al. discloses a stainless steel sprocket support shaft for a nozzleless conveyor belt and sprocket cleaning apparatus. The stainless steel sprocket may be surface finished by electropolishing. U.S. Pat. No. 5,491,036 to Carey, II et al. generally discloses an electrolysis process for applying a tin coating of carbon steel.

SUMMARY OF THE INVENTION

The above described patents propose a variety of methods for electropolishing or electroplating various materials. However, there still exists a need for a system and method for electropolishing and electroplating metal conveyor belts that improves sanitation and product release characteristics, particularly with respect to conveyor belts used in food processing. There also exists a need for a system and method for electropolishing and electroplating metal conveyor belts that reduces wear and friction on the conveyor belts. There further exists a need for a system and method for electropolishing and electroplating localized areas of metal conveyor belts.

In view of the foregoing, one aspect of the present invention provides a continuous electropolishing and/or electroplating process for localized areas of metal conveyor belts. This process provides benefits such as improved sanitation, improved product release characteristics, brighter cosmetic appearance, removal of weld discoloration, and reduced wear and friction, which are particularly important for conveyor belts used in food processing.

As opposed to conventional polishing processes in which the product is guided around rollers which direct the product into and out of an electrolyte bath, embodiments of the present invention pass the product through a housing supplied with a continuous directional flow of electrolyte. Thus, the electroplating or electropolishing can be targeted to specific areas of the product, such as the edges of a conveyor belt, and straight products can pass through the housing without deformation (i.e., because guiding by rollers into and out of a bath is not required). This reduces the amount of electrolyte required in the system; reduces human exposure to the electrolyte during operation; reduces evaporation and environmental contamination of the electrolyte; reduces set-up time because the electrolyte can be quickly removed from the polishing area; and optimizes current and fluid flow to improve efficiency compared to conventional processes. In addition, fresh electrolyte can be concentrated at the polishing site, without solution in a bath of used electrolyte, for more effective electropolishing or electroplating.

Belts can be separated into smaller sections, typically 50 to 100 feet long, for ease of handling and shipping. These sections may be connected sequentially, such that the leading end of a new roll of belt is connected to the trailing end of the previous roll of belt, to maintain a continuous process. These sections can be disconnected and placed on separate take-up rolls after processing. Leader chains may also be used to guide the ends of the belt into and out of the bath while maintaining tension. Materials used in the process, such as the plate material and electrolyte material, may be of any suitable type such as are currently used or may be developed for electropolishing and electroplating.

According to one embodiment, a system for electropolishing or electroplating a conveyor belt is described. The system comprises a housing comprising an electrical conductor and an opening configured to receive a portion of the conveyor belt in the opening; a seal provided in the opening; an inlet configured to supply electrolytic solution to the housing; and an electrical contact configured to apply current to the conveyor belt.

According to another embodiment, a method for electropolishing or electroplating a conveyor belt is described. The method comprises guiding a portion of the conveyor belt through a housing comprising an electrical conductor and a seal; applying current to the conveyor belt with an electrical contact; and supplying an electrolytic solution to the housing through an inlet, thereby electroplating or electropolishing the portion of the conveyor belt.

Still other aspects, features and advantages of the present invention are readily apparent from the following detailed description, simply by illustrating a number of exemplary embodiments and implementations, including the best mode contemplated for carrying out the present invention. The present invention also is capable of other and different embodiments, and its several details can be modified in various respects, all without departing from the spirit and scope of the present invention. Accordingly, the drawings and descriptions are to be regarded as illustrative in nature, and not as restrictive.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

DETAILED DESCRIPTION

A system and method for electropolishing or electroplating a continuous assembly of interconnected components is described. In the following description, for purposes of explanation, numerous specific details are set forth in order to provide a thorough understanding of the exemplary embodiments. It is apparent to one skilled in the art, however, that the present invention can be practiced without these specific details or with an equivalent arrangement.

Figure 1:
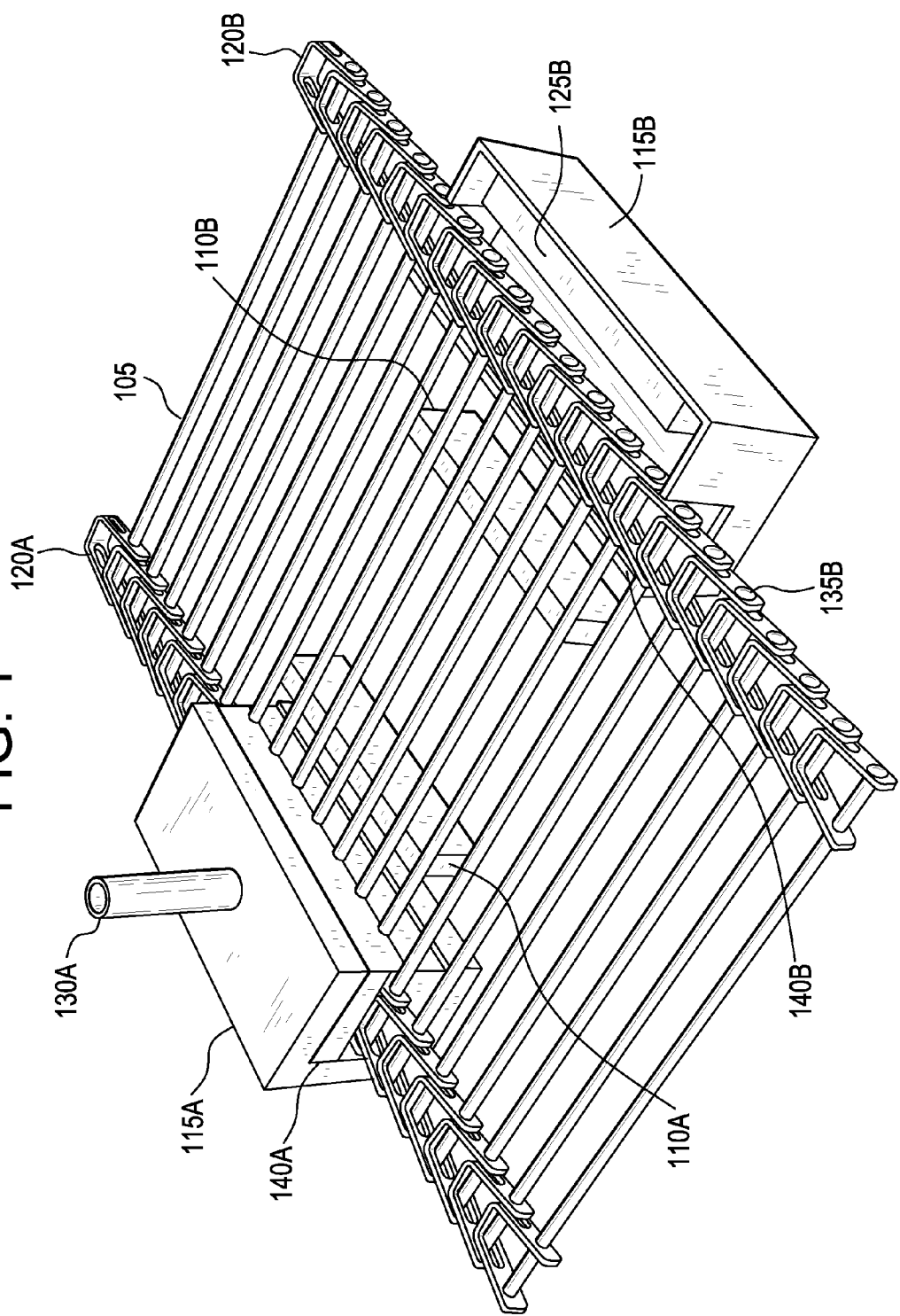
FIG. 1 is a perspective view of a system for electropolishing or electroplating a continuous assembly of interconnected components in accordance with an embodiment.

Referring now to the drawings, wherein like reference numerals designate identical or corresponding parts throughout the several views, FIG. 1 is a perspective view of a system for electropolishing or electroplating a continuous assembly of interconnected components in accordance with an embodiment. In this embodiment, the continuous assembly of interconnected components is a conveyor belt 105. As illustrated in FIG. 1, two housings 115A and 115B are positioned at the edges of conveyor belt 105 in order to electropolish or electroplate edge links 120A and edge links 120B, respectively. In some embodiments, however, only a single housing 115A or 115B can be positioned on an edge of conveyor belt 105 to electropolish or electroplate only one of edge links 120A or edge links 120B, respectively. It is understood that housing 115B is cutaway in FIG. 1 for purposes of explanation only, and that in practice, the exterior of housing 115B resembles housing 115A. Further, it is understood that the interior of housing 115A resembles that shown with respect to housing 115B. Although not shown in FIG. 1, it is contemplated that other features of the conveyor belt may be electropolished or electroplated with or instead of edge links 120A and edge links 120B, such as edge guards or lane dividers.

Electrical contacts 110A and 110B placed on conveyor belt 105 cause the conveyor belt 105 to become an anode (in the case of electropolishing) or cathode (in the case of electroplating). Force may be placed on electrical contact 110A and/or electrical contact 110B to ensure consistent contact with conveyor belt 105 and consistent current. Such a force can be applied by a spring, a pneumatic system, a hydraulic system, gravity, and/or similar means. In one embodiment, electrical contact 110A and/or electrical contact 110B are movable or floating to accommodate variations in the dimensions of conveyor belt 105.

In this embodiment, an electrical conductor 125B is placed in housing 115B to serve as a cathode (in the case of electropolishing) or anode (in the case of electroplating). In a similar fashion, an electrical conductor (not shown) is placed in housing 115A to serve as a cathode (in the case of electropolishing) or anode (in the case of electroplating). In this embodiment, electrical conductor 115B is placed proximate to the edge of edge links 120B in order to target polishing or plating at the weld 135B of conveyor belt 105. However, it is contemplated that electrical conductor 115B can be placed in any position proximate to any particular area to be electropolished or electroplated.

In one embodiment, housing 115A and housing 115B are made of copper or another conductive material, and can themselves serve as a cathode (in the case of electropolishing) or anode (in the case of electroplating), with or without electrical conductors internal to housing 115A or housing 115B. Housing 115A, housing 115B and the electrical conductors (i.e., the electrical conductor internal to housing 115A and electrical conductor 125B) can be sized and positioned such that the surface of the electrical conductors are equidistant from all surfaces of edge links 120A and edge links 120B for even polishing. Nonconductive wear surfaces may be placed in housing 115A and housing 115B in any practical configuration, such as a bushing or perforated liner, to prevent contact between conveyor belt 105 and the electrical conductors, to prevent contact between conveyor belt 105 and the electrical conductors while allowing current to flow between the electrical conductors and conveyor belt 105.

Although shown as rectangular and elongated in shape, it is contemplated that housing 115A and housing 115B can be of any shape or size suitable to achieve electropolishing or electroplating as described herein. Further, housing 115A and housing 115B can be constructed as a single body, or can be made of separable components, such as a body and removable lid.

Electrolyte may be introduced at any point along the length of housings 115A and 115B. In this embodiment, electrolyte is introduced into housing 115A via inlet 130A. It is understood that electrolyte is introduced into housing 115B via a similar inlet (not shown). Electrolyte may flow in either direction through housings 115A and 115B, i.e., in the direction of travel of conveyor belt 105 through housings 115A and 115B, or counter to the direction of travel of conveyor belt 105 through housings 115A and 115B.

In one embodiment, housings 115A and 115B are open at the ends to allow electrolyte to flow out and to allow conveyor belt 105 to pass through. In another embodiment, a separate orifice is provided for the electrolyte outflow. The outflow orifice may be arranged in an upward direction to facilitate removal of gases produced during the electropolishing or electroplating process. Orifices are sized to restrict outflow, and housings 115A and 115B are provided with seals 140A and 140B, respectively, so that the housings 115A and 115B are flooded to a level that provides effective electropolishing or electroplating. Seals 140A and 140B need not stop liquid flow altogether, but rather restrict it enough to cause flooding of the housing. Exemplary seals can be made of rubber sheeting or brushes.

Figure 2:
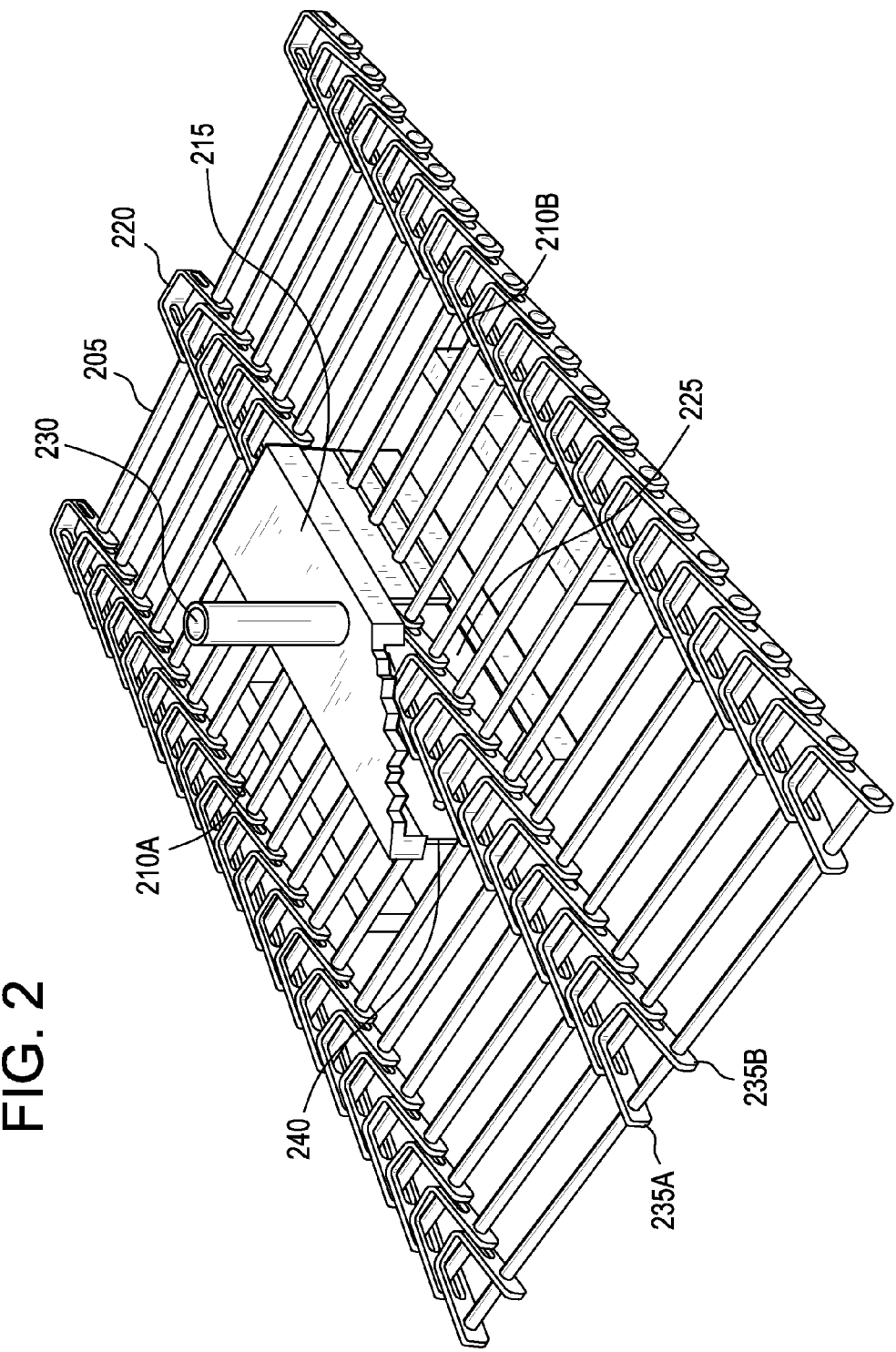
FIG. 2 is a perspective view of a system for electropolishing or electroplating a continuous assembly of interconnected components in accordance with an embodiment.

FIG. 2 is a perspective view of a system for electropolishing or electroplating a continuous assembly of interconnected components in accordance with another embodiment. In this embodiment, the continuous assembly of interconnected components is a conveyor belt 205 having a plurality of center links 220 to be electropolished or electroplated. Center links 220 are any links positioned between the edges of conveyor belt 205, and do not necessarily need to be centered between the edges of conveyor belt 205. Center links 220 are positioned laterally to create a desired turn radius and to control expansion and collapse of the edge links of conveyor belt 205. A single housing 215 is positioned along the width of the conveyor belt 205 in order to electropolish or electroplate center links 220. It is understood that housing 215 is cutaway in FIG. 2 for purposes of explanation only, and that housing 215 is rectangular in shape in use. Although not shown in FIG. 2, it is contemplated that other features of the conveyor belt may be electropolished or electroplated with or instead of center links 220, such as edge guards or lane dividers. Further, although shown and described with respect to a single housing 215 and a single column of center links 220, it is contemplated that multiple columns of center links 220 may be present, or multiple other features to be electropolished or electroplated, as well as their accompanying housings.

Electrical contacts 210A and 210B are placed on conveyor belt 205 in a manner similar to that described with respect to electrical contacts 110A and 110B of FIG. 1. An electrical conductor 225 is placed in housing 215 to serve as a cathode (in the case of electropolishing) or an anode (in the case of electroplating). In this embodiment, electrical conductor 225 is placed on the bottom of housing 215, underneath both of the welded edges 235A and 235B of center links 220. However, it is contemplated that electrical conductor 225 can be placed in any position proximate to any particular area to be electropolished or electroplated.

As with respect to FIG. 1, housing 215 can be made of copper or another conductive material, and can itself serve as a cathode (in the case of electropolishing) or anode (in the case of electroplating), with or without electrical conductors internal to housing 215. Housing 215 and electrical conductor 225 can be sized and positioned such that the surface of the electrical conductor 225 is equidistant from all surfaces of center links 220 for even polishing. Nonconductive wear surfaces may be placed in housing 225 in any practical configuration, such as a bushing or perforated liner, to prevent contact between conveyor belt 205 and the electrical conductors, to prevent contact between conveyor belt 205 and the electrical conductors while allowing current to flow between the electrical conductors and conveyor belt 205.

Although shown as rectangular and elongated in shape, it is contemplated that housing 215 can be of any shape or size suitable to achieve electropolishing or electroplating as described herein. Further, housing 215 can be constructed as a single body, or can be made of separable components, such as a body and removable lid.

Electrolyte is introduced via inlet 230 at a central location with respect to the length and width of housing 215, as is described with respect to FIG. 1. Electrolyte may flow in either direction through housing 215, i.e., in the direction of travel of conveyor belt 205 through housing 215, or counter to the direction of travel of conveyor belt 205 through housing 215.

In this embodiment, housing 215 is open at the ends to allow electrolyte to flow out and to allow conveyor belt 205 to pass through. As is described above with respect to FIG. 1, a separate orifice may instead be provided for the electrolyte outflow. Housing 215 is provided with a seal 240 so that the housing 215 is flooded to a level that provides effective electropolishing or electroplating, while minimizing electrolyte loss. In this embodiment, seal 240 is positioned on both sides of center links 220. Although shown and described as separate embodiments, it is contemplated that both the edge links and the center links of a conveyor belt can be polished simultaneously, by combining the embodiment of FIG. 1 with that of FIG. 2.

Figure 3:
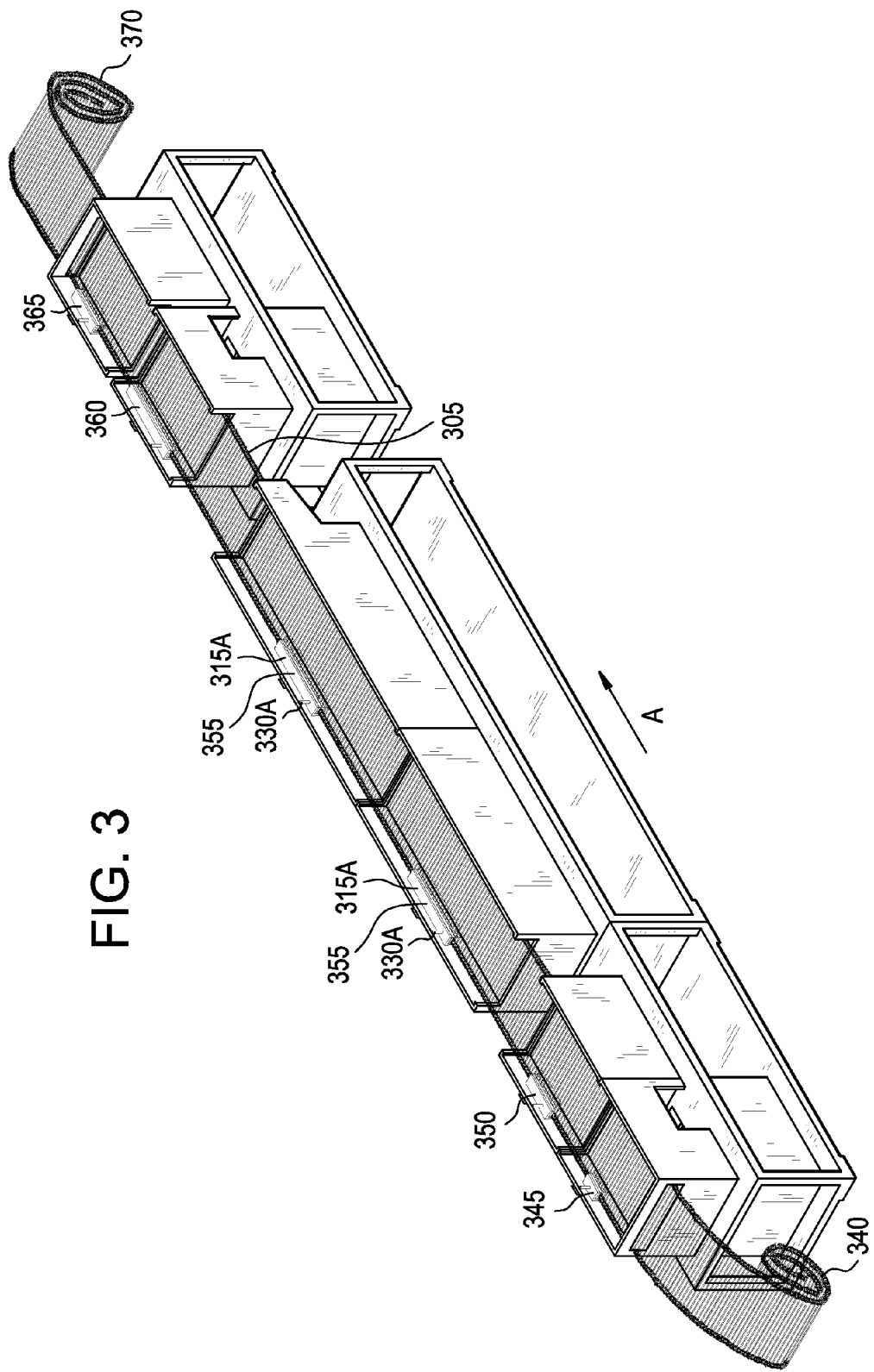
FIG. 3 is a perspective view of a system for electropolishing or electroplating a continuous assembly of interconnected components in accordance with an embodiment.

FIG. 3 is a perspective view of a system for electropolishing or electroplating a continuous assembly of interconnected components in accordance with an embodiment. In this embodiment, the continuous assembly of interconnected components is conveyor belt 305. To create a continuous electropolishing or electroplating process, conveyor belt 305 is unrolled from an in-feed roll 340 into cleaning station 345, traveling in a direction A. Cleaning station 345 cleans the edge links of conveyor belt 305 and degreases them, for example. Conveyor belt 305 is then rinsed at rinse station 350.

Electroplating or electropolishing is achieved at electroplating/electropolishing stations 355. Although illustrated with two electroplating/electropolishing stations 355, it is contemplated that only a single electroplating/electropolishing station 355 can be provided, or multiple electroplating/electropolishing stations 355 can be provided in series. Electroplating/electropolishing stations 355 have housings 315A to polish one edge of the conveyor belt, as well as housings opposite to housing 315A (not shown) to polish the opposite edge of conveyor belt 355. It is contemplated that housings 315A, as well as the opposing housings, may be similar or identical to housings 115A and 115B, respectively, of FIG. 1. Further, although shown and described herein only with respect to housings 315A, it is contemplated that a similar or identical process may be carried out with respect to the opposing housings. Although not shown in FIG. 3, it is contemplated that other features of the conveyor belt may be electropolished or electroplated with or instead of the edge links of conveyor belt 305, such as edge guards or lane dividers.

Electrical contacts placed on conveyor belt 305 cause the conveyor belt to become an anode (in the case of electropolishing) or cathode (in the case of electroplating). Electrical conductors are placed in housings 315A to serve as a cathode (in the case of electropolishing) or anode (in the case of electroplating). Electrolytic solution is provided via inlets 330A to housings 315A, immersing the edges of conveyor belt 305 within the housings 315A in electrolytic solution.

With respect to electroplating, a current is applied to the electrical conductors, oxidizing the metal atoms that comprise the electrical conductors and allowing them to dissolve into the electrolytic solution. The dissolved metal ions are moved by the electric field to conveyor belt 305, coating conveyor belt 305 and depositing a layer of metallic material on the surface of conveyor belt 305.

With respect to electropolishing, a current is applied to conveyor belt 305, oxidizing the metal atoms on the surface of conveyor belt 305 and allowing them to dissolve into the electrolytic solution. The dissolved metal ions in the electrolytic solution are moved by the electric field to the electrical conductors. Thus, a smoother, polished surface results on conveyor belt 305.

Once conveyor belt 305 has been electropolished or electroplated, it is moved into post-treatment station 360 (where it undergoes, e.g., a nitric acid rinse), then undergoes a final rinse at rinse station 365. Optionally, conveyor belt 305 can be moved through a dryer (not shown). Conveyor belt 305 is moved onto take-up roll 370. It is contemplated that conveyor belt 305 can be moved from in-feed roll 340 to take-up roll 370 by any suitable means, such as, for example, a system drive or motor. Although shown and described with respect to the electropolishing or electroplating of the edge links, it is contemplated that FIG. 3 can be modified to instead or additionally electropolish or electroplate center links, if present.

Although described herein with respect to conveyor belts, it is contemplated that the methods and systems described herein can be applied to any rollable and/or conductive materials, including chains or other continuous assemblies of interconnected components. Such electropolishing or electroplating applied in accordance with the described embodiments results in improved sanitation, reduced wear and friction on the treated parts, and improved product release characteristics, particularly with respect to food processing applications.

The present invention has been described in relation to particular examples, which are intended in all respects to be illustrative rather than restrictive. Those skilled in the art will appreciate that many different combinations of materials and components will be suitable for practicing the present invention.

Other implementations of the invention will be apparent to those skilled in the art from consideration of the specification and practice of the invention disclosed herein. Various aspects and/or components of the described embodiments may be used singly or in any combination. It is intended that the specification and examples be considered as exemplary only, with a true scope and spirit of the invention being indicated by the following claims.

What is claimed is:

1. A system for electropolishing or electroplating a conveyor belt, the conveyor belt including a plurality of rods connected together by a plurality of rows of links, the system comprising:
   a housing comprising an electrical conductor and an opening configured to receive a first row of links of the plurality of rows of links;
   a seal provided in the opening configured to allow the plurality of rods extending from the first row of links to extend outside of the housing, as the first row of links passes through the housing, and limit electrolytic solution from leaving the housing;
   an inlet configured to supply the electrolytic solution to the housing; and
   an electrical contact configured to apply current to the conveyor belt.

2. The system of claim 1, wherein the electrical contact is held in place against the conveyor belt by at least one of spring tension, pneumatic force, hydraulic force, and gravity.

3. The system of claim 1, further comprising an outlet configured to remove the electrolytic solution from the housing.

4. The system of claim 1, wherein the housing is elongated.

5. The system of claim 1, wherein the system includes a pair of seals configured to allow the plurality of rods extending from the first row of links to extend outside and on opposite sides of the housing, and the first row of links comprises center links.

6. The system of claim 5, further comprising:
   one or more second housings, each comprising a second electrical conductor and a second opening, each second opening being configured to receive a second row of links of the plurality of rows of links,
   wherein each second opening has a second seal configured to allow the plurality of rods extending from the second row of links to extend outside of each second housing and limit electrolytic solution from leaving each second housing,
   wherein each second housing has a second inlet configured to supply the electrolytic solution to the second housing, and
   wherein each second row of links comprises center links.

7. The system of claim 1, wherein the first row of links comprises first edge links.

8. The system of claim 7, further comprising:
   a second housing comprising a second electrical conductor and a second opening configured to receive a second row of links;
   a second seal provided in the second opening configured to allow the plurality of rods extending from the second row of links to extend outside of the second housing and limit electrolytic solution from leaving the second housing; and
   a second inlet configured to supply the electrolytic solution to the second housing.

9. The system of claim 8, wherein the system includes a pair of second seals configured to allow the plurality of rods extending from the second row of links to extend outside of the second housing on opposite sides of the second housing, and the second row of links comprises center links.

10. The system of claim 9, further comprising:
    one or more third housings, each comprising a third electrical conductor and a third opening, each third opening being configured to receive a third row of links of the plurality of rows of links,
    wherein each third opening has a third seal configured to allow the plurality of rods extending from the third row of links to extend outside of each third housing and limit electrolytic solution from leaving each third housing,
    wherein each third housing has a third inlet configured to supply the electrolytic solution to the third housing, and
    wherein each third row of links comprises center links.

11. The system of claim 8, wherein the second row of links comprises second edge links.

12. The system of claim 11, further comprising:
    a third housing comprising a third electrical conductor and a third opening configured to receive a third row of links;
    a third seal provided in the third opening configured to allow the plurality of rods extending from the third row of links to extend outside of the third housing and limit electrolytic solution from leaving the third housing; and
    a third inlet configured to supply the electrolytic solution to the third housing.

13. The system of claim 12, wherein the system includes a pair of third seals configured to allow the plurality of rods extending from the third row of links to extend outside of the third housing on opposite sides of the third housing, and the third row of links comprises center links.

14. The system of claim 13, further comprising:
    one or more fourth housings, each comprising a fourth electrical conductor and a fourth opening, each fourth opening being configured to receive a fourth row of links of the plurality of rows of links,
    wherein each fourth opening has a fourth seal configured to allow the plurality of rods extending from the fourth row of links to extend outside of each fourth housing and limit electrolytic solution from leaving each fourth housing,
    wherein each fourth housing has a fourth inlet configured to supply the electrolytic solution to the fourth housing, and
    wherein each fourth row of links comprises center links.

15. A method for electropolishing or electroplating a conveyor belt, the conveyor belt including a plurality of rods connected together by a plurality of rows of links, the method comprising:
    guiding a first row of links of the plurality of rows of links through a housing while passing a remainder of the plurality of rows of links outside of and past the housing, the housing comprising an electrical conductor and a seal;
    applying current to the conveyor belt with an electrical contact; and
    supplying an electrolytic solution to the housing through an inlet, thereby electroplating or electropolishing the first row of links of the conveyor belt.

16. The method of claim 15, wherein the electrical contact is held in place against the conveyor belt by at least one of spring tension, pneumatic force, hydraulic force, and gravity.

17. The method of claim 15, further comprising:
removing the electrolytic solution from the housing via an outlet.

18. The method of claim 15, wherein the housing is elongated.

19. The method of claim 15, further comprising:
rinsing the conveyor belt.

20. The method of claim 15, wherein the first row of links comprises center links.

21. The method of claim 20, further comprising:
guiding one or more second rows of links of the plurality of rows of links through one or more second housings while passing a remainder of the plurality of rows of links outside of and past the one or more second housings, each second housing comprising a second electrical conductor and a second seal;
applying current to the conveyor belt with one or more second electrical contacts; and
supplying an electrolytic solution to the one or more second housings through one or more second inlets, thereby electroplating or electropolishing the one or more second rows of links,
wherein each second row of links comprises edge links.

22. The method of claim 15, wherein the first row of links comprises first edge links.

23. The method of claim 22, further comprising:
guiding a second row of links of the plurality of rows of links through a second housing while passing a remainder of the plurality of rows of links outside of and past the second housing, the second housing comprising a second electrical conductor and a second seal;
applying current to the conveyor belt with the electrical contact; and
supplying an electrolytic solution to the second housing through a second inlet, thereby electropolishing or electroplating the second row of links.

24. The method of claim 23, wherein the second row of links comprises center links.

25. The method of claim 24, further comprising:
guiding one or more third rows of links of the plurality of rows of links through one or more third housings while passing a remainder of the plurality of rows of links outside of and past the one or more third housings, each third housing comprising a third electrical conductor and a third seal;
applying current to the conveyor belt with one or more third electrical contacts; and
supplying an electrolytic solution to the one or more third housings through one or more third inlets, thereby electroplating or electropolishing the one or more third rows of links,
wherein each third row of links comprises center links.

26. The method of claim 23, wherein the second row of links comprises second edge links.

27. The method of claim 26, further comprising:
guiding a third row of links of the plurality of rows of links through a third housing while passing a remainder of the plurality of rows of links outside of and past the third housing, the third housing comprising a third electrical conductor and a third seal;
applying current to the conveyor belt with the electrical contact; and
supplying an electrolytic solution to the third housing through a third inlet, thereby electropolishing or electroplating the third row of links.

28. The method of claim 27, wherein the third row of links comprises center links.

29. The method of claim 28, further comprising:
guiding one or more fourth row of links of the plurality of rows of links through one or more fourth housings while passing a remainder of the plurality of rows of links outside of and past the one or more fourth housings, each fourth housing comprising a fourth electrical conductor and a fourth seal;
applying current to the conveyor belt with one or more fourth electrical contacts; and
supplying an electrolytic solution to the one or more fourth housings through one or more fourth inlets, thereby electroplating or electropolishing the one or more fourth rows of links,
wherein each fourth row of links comprises center links.

* * * * *